United States Patent [19]

Houck

[11] Patent Number: 5,265,898
[45] Date of Patent: Nov. 30, 1993

[54] IMPLEMENT HITCH FOR PLANTING AND TRANSPORT

[76] Inventor: Shane A. Houck, R.R. 1, Box 182, Pennville, Ind. 47369

[21] Appl. No.: 938,762

[22] Filed: Sep. 1, 1992

[51] Int. Cl.⁵ ............................................. B62D 53/00
[52] U.S. Cl. ................................ 280/413; 172/311; 172/313
[58] Field of Search .................. 280/411.1, 412, 413; 172/311, 313, 314; 56/6

[56] References Cited

U.S. PATENT DOCUMENTS

| | | | |
|---|---|---|---|
| 2,976,058 | 3/1961 | Sandgren | 280/413 |
| 3,064,996 | 11/1962 | Roppel | 280/412 |
| 3,162,459 | 12/1964 | Marmorine et al. | 280/34 |
| 3,738,682 | 6/1973 | Ritter | 280/413 |
| 4,113,273 | 9/1978 | Gates | 280/413 |
| 4,213,628 | 7/1980 | Hardesty | 280/412 |
| 4,361,341 | 11/1982 | Gustafson | 280/415 |
| 4,381,118 | 4/1983 | Weeks | 280/412 |
| 4,577,881 | 3/1986 | Gerber | 280/412 |
| 4,601,484 | 7/1986 | Baker et al. | 280/411 |
| 4,881,603 | 11/1989 | Hartman | 172/311 |

Primary Examiner—Sherman Basinger
Attorney, Agent, or Firm—Palmatier, Sjoquist & Helget

[57] ABSTRACT

Hitching apparatus for pulling a pair of grain drills behind a tractor, alternately in field position wherein the grain drills are in side-by-side and substantially aligned relation with each other, and transport position wherein the grain drills are arranged one behind the other in tandem relation, a pull pole swingably secured to a side portion of the front frame of the first grain drill and swingable between a transport position wherein the front end of the pull pole is aligned forwardly of the central portion of the first grain drill, and a latch mechanism retaining the pull pole in said transport position; and the pull pole being swingable to the field or planting position wherein the front end of the pull pole is substantially aligned with the adjoining side portions of the two grain drills and is retained by the latching mechanism; a swing arm pulling the second grain drill and extending transversely from the pull pole and the front frame of the first grain drill in field position and being retained by the latch mechanism; and the swing arm being swingably attached to the side portion of the first grain drill to swing behind the first grain drill as to locate the second grain drill behind and in tandem relation with the first grain drill in transport position, and a latching mechanism retaining the swing arm in said transport position.

15 Claims, 7 Drawing Sheets

IMPLEMENT HITCH FOR PLANTING AND TRANSPORT

This invention relates to a hitch for multiple field implements such as grain drills.

BACKGROUND OF THE INVENTION

Field implements such as grain drills and other seed drills are generally used in multiple or ganged assemblies. In planting or field position, the implements are best arranged in side-by-side relation to each other, and in very close and almost touching relation to each other so that the field may be planted substantially uniformly.

Such implements often need to be transported from field to field, through gates, and along roadways. For this purpose, the implements are preferably arranged in tandem relation, one behind the other.

Apparatus for alternately arranging and towing such implements in planting position and transport position have been attempted previously with varying success. For instance, U.S. Pat. No. 4,881,603 tows three implements side by side in planting position, but in transport position, the implements are not all one behind the other. U.S. Pat. No. 4,361,341 will tow multiple elongate implements to travel endways in transport, contrary to their normal mode of travel. Similar is U.S. Pat. No. 3,162,459. U.S. Pat. No. 4,381,118 arranges the implements one behind the other in transport, but the implements are not side by side in planting position. In U.S. Pat. No. 3,064,996, the implements are arranged in side-by-side relation during planting and tandem relation during transport, but the hitch is required to pass over the top of one implement and may interfere with certain functions of the implement and is excessively complicated.

SUMMARY OF THE INVENTION

An object of the invention is to provide a hitch or towing frame for a pair of implements such as grain drills in order to alternately arrange the implements in side-by-side planting position and in tandem transport position, and which is readily applied to the normal frame structures of the implements without modification and without interfering or affecting the normal operation and functions of such grain drills.

A feature of the invention comprises a pull pole attachable to the front frame of a first grain drill to be swingable transversely between a transport position wherein the tractor attaching front end of the pull pole aligns with the central portion of the front frame, and a planting position wherein the front end of the pull pole aligns substantially forwardly of the adjoining side portions of the two grain drills in side-by-side planting position.

Another feature of the invention comprises an L-arm pivotally attachable to a side portion of the front frame of a first grain drill and pivotally connected to the towing tongue of the second grain drill approximately at the central portion of the front frame thereof. The L-arm is horizontally swingable around the first grain drill between a planting position wherein the L-arm protrudes transversely from the front frame of the first grain drill to position and tow the second grain drill in alignment and side-by-side relation with the first drill, and a transport position wherein the L-arm trails behind the first drill to position and tow the second drill directly behind and in tandem relation to the first drill. Still other features of the invention are latching mechanisms releasably retaining the pull pole and L-arm in planting position, releasably retaining the pull pole in transport position, and releasably retaining the L-arm in transport position.

An additional feature of the invention comprises an extendible and retractable releasable grasping device on the first grain drill to reach out and grasp the L-arm as the L-arm approaches its transport position and to swingably move the L-arm and second drill into final transport position directly behind the first grain drill.

DETAILED SPECIFICATION

Figure 1:
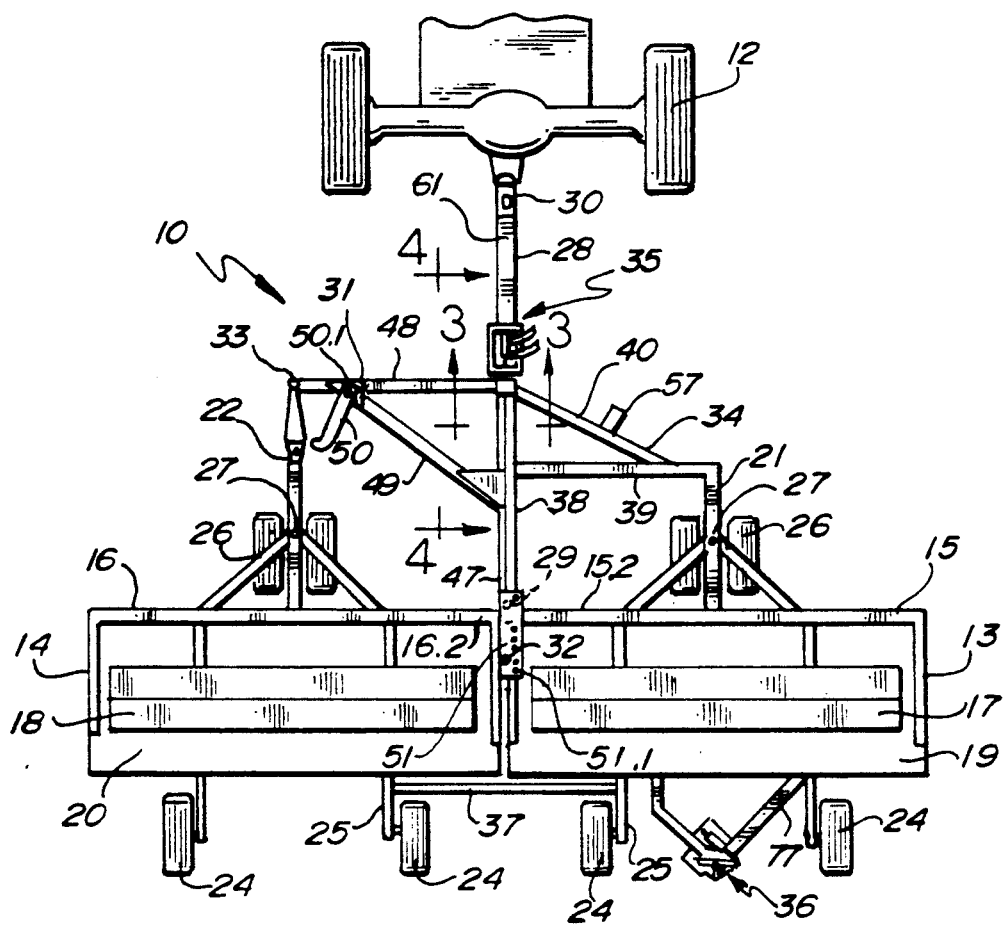
FIG. 1 is a top plan view illustrating the hitch apparatus with the field implements or grain drills arranged in field or planting position.
Figure 3:
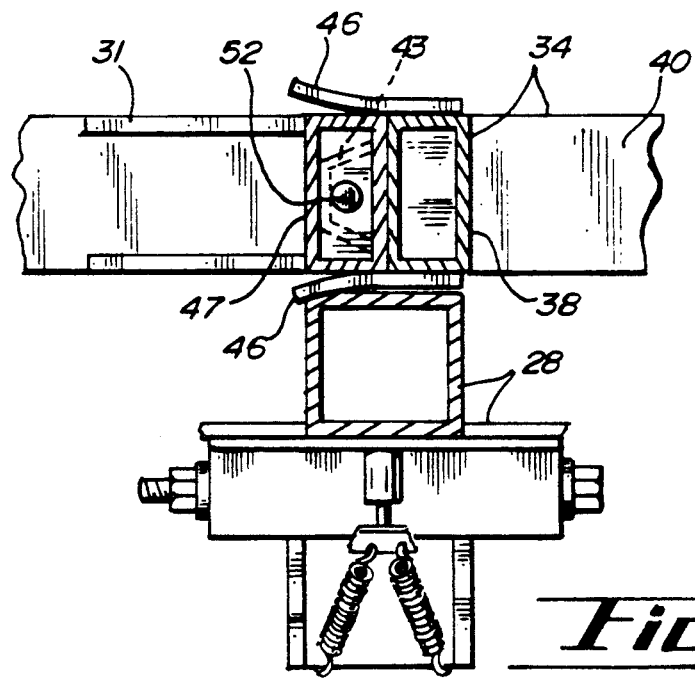
FIG. 3 is a detail section view taken approximately at 3—3 in FIG. 1.

The hitch apparatus 10 in general connects the drawbar 11 of the tractor 12 to a pair of agricultural field implements 13 and 14 and in the particular form shown, the implements are grain drills. The grain drill 13 is referred to as the first grain drill and the grain 14 is referred to as the second grain drill.

The two grain drills 13 and 14 are substantially identical to each other, and each of the grain drills has a front frame portion 15, 16, respectively, a grain box 17, 18, and a rear platform 19, 20 upon which a person may stand while filling the adjacent grain box by pouring grain into its open top, which is ordinarily covered by a lid. Because access must be had into the open top for supplying grain and cleaning the interior of the grain box from time to time, it is important that the spaces above the grain boxes 17, 18 be clear and unobstructed of operating apparatus.

At the central portions 15.1, 16.1 of the front frames 15, 16 the grain drills are provided with forwardly extending towing portions or tongues 21, 22, and it will be recognized that the towing tongue 22 of the implement 14 has been provided with an extension 23.

Each of the grain drills is provided with a pair of rear support wheels 24 which are widely separated from each other and are individually mounted on stationary support brackets 25 maintaining wheels in the predetermined orientation for forward and rearward travel.

Each of the grain drills also has a pair of front supporting wheels 26 which are mounted on the tongue portions 21, 22 by vertical pivots 27 so that the front support wheels 26 may turn from side to side.

Figure 2:
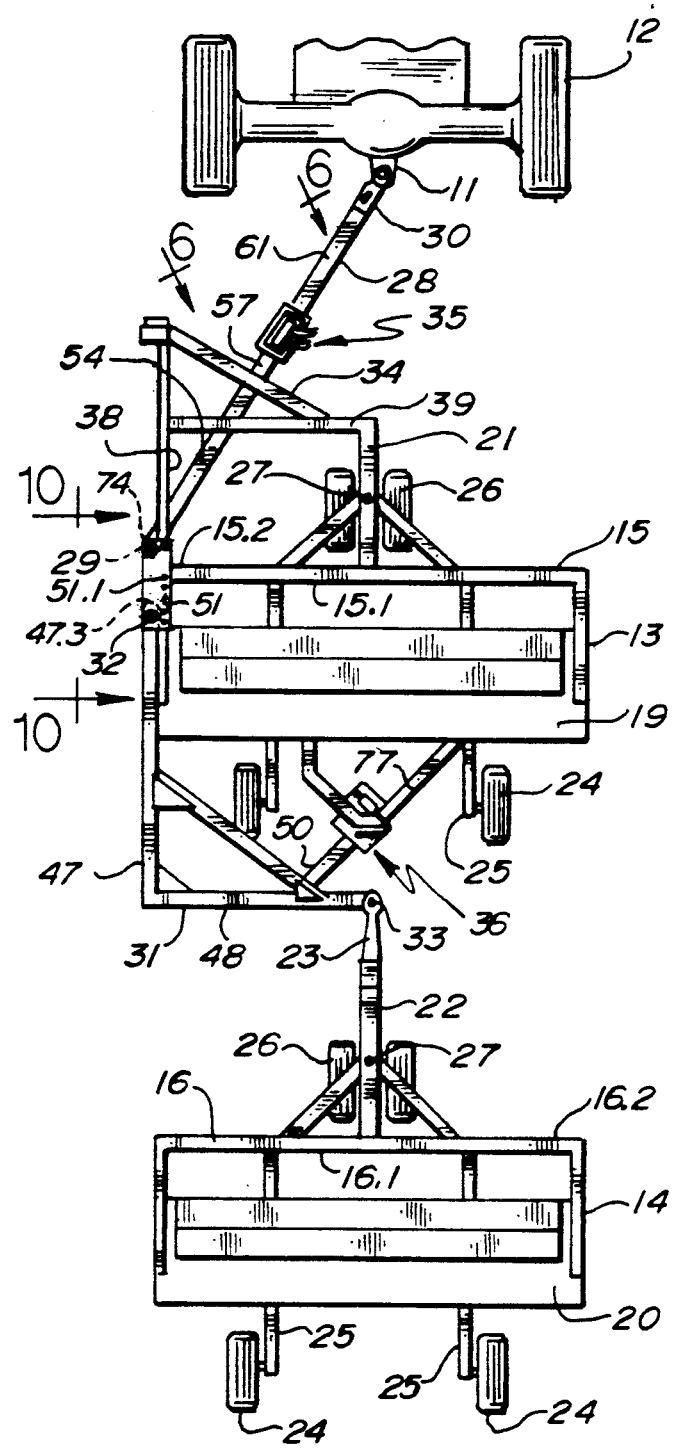
FIG. 2 is a top plan view of the hitch apparatus with the field implements or grain drills arranged in transport position.

The hitch apparatus 10 includes several major components to accomplish the positioning of the grain drills 13 and 14 in side-by-side alignment referred to as planting or field position illustrated in FIG. 1, and in tandem arrangement one behind the other, or transport position, as illustrated in FIG. 2. Those major components are a pull pole 28 connected to the side portion 15.2 of the front frame of the first grain drill 13 by a pivot 29 to accommodate swinging of the pull pole 28 between the transport position thereof, illustrated in FIG. 2, wherein the front connector portion 30 thereof is oriented generally forwardly of the central portion 15.1 of the front frame 15 and generally forwardly of the central portion of the first grain drill 13. The pivot 29 which mounts the pull pole 28 also accommodates swinging of the pull pole 28 into its field or planting position illustrated in FIG. 1 wherein the front connector portion 30 thereof, which attaches to the tractor drawbar, is located substantially forwardly of, and in general alignment, with the side portion 15.2 of the front frame 15 of the first grain drill 13, and also in substantial alignment with the adjacent side portion 16.2 of the front frame 16 of the second grain drill 14 which, in field or planting position illustrated in FIG. 1, is in closely spaced and adjoining relation with the side portion 15.2 of the first grain drill 13.

Another major component of the hitch apparatus 10 comprises a swing arm indicated in general by numeral 31 which is swingably connected to the side portion 15.2 of the front frame of the first implement or grain drill 13 by a pivot 32 and is connected by a pivot or rotatable connector means 33 to the extension portion 23 of the towing tongue 22 of field implement or grain drill 14, all for the purpose of locating and towing the second grain drill 14 in field or planting position as illustrated in FIG. 1, and in transport position as illustrated in FIG. 2.

Another component of the hitching apparatus 10 comprises a stationary hitch frame 34 affixed as by welding to the side portion 15.2 of the front frame 15 of the first implement or grain drill 13 and also to the tongue 21 thereof; and the hitch frame 34 constitutes a forward extension of the stationary front frame 15 of the implement 13.

Another major component of the hitch apparatus 10 comprises a latching mechanism 35 on the pull pole 28 for alternately latching the pull pole 28 to the stationary hitch frame 34 in its planting position, illustrated in FIG. 1, and in transport position, as illustrated in FIG. 2. The latching mechanism 35 also functions to latch the swing arm 31 to the stationary hitch frame 34 in its planting position, illustrated in FIG. 1, and releasing the swing arm 31 so that it may swing around the end of the first implement 13 and partly behind the first implement 13 as the second implement 14 is positioned in its transport position.

Another major component of the hitch apparatus 10 comprises a latching mechanism indicated in general by numeral 36 for latching the swing arm 31 in its transport position to the rear portion of the first implement 13, with the pivot 33 located centrally behind implement 13, illustrated in FIG. 2, and for releasing the swing arm 31 so that the swing arm may be returned to its planting position, illustrated in FIG. 1.

The general operation of the hitch will be described, and then the details of the major components will be described in more detail. Assuming that grain drills 13, 14 are in the planting position illustrated in FIG. 1, and assuming that it is desired to transport the grain drills to a different field, through a gate, or along a roadway, the grain drills must be reoriented from the planting position, illustrated in FIG. 1 to the transport position, illustrated in FIG. 2. The entire changeover can be accomplished by manipulating the tractor 12 and the latching mechanisms 35 which are hydraulically operated.

In the position of FIG. 1, the implements 13, 14 are first prepared for changing from planting position to transport position by releasing the tie bar 37, as to allow the side-by-side implements to separate first, the latching mechanism 35 is operated to release the swing arm 31 to allow the swing arm to swing in a counterclockwise direction around pivot 32; and releasing of the latch mechanism 35 will also allow the pull pole 28 to be swung over to the transport position illustrated in FIG. 2. In order to swing the pull pole 28 over to the transport position of FIG. 2, the tractor 12 is simply turned sharply to the right until the pull pole assumes the position illustrated in FIG. 2, whereupon the latching mechanism 35 is operated again to latch the pull pole 28 in transport position illustrated in FIG. 2. As the tractor initially moves to the right, it will be subsequently moved forwardly after the latching mechanism 35 is again latched; and the tractor, moving forwardly, will pull the first grain drill 13 forwardly with it, and as the first grain drill 13 is pulled forwardly, the second grain drill 14 will lag behind as the swing arm 31 generally swings in a counterclockwise direction so that the swing arm will assume a position nearly as illustrated in FIG. 2, but slightly to the left. When the swing arm has oriented the second grain drill 14 behind the first grain drill, the tractor will be stopped, and simply by reversing the tractor T and the first grain drill 13, the counterclockwise swinging of the swing arm 31 will be completed so that the swing arm is engaged by the latching mechanism 36 whereby the second grain drill 14 is oriented and retained in tandem relation to the first grain drill 13 for transport.

When the grain drills 13 and 14 are to be reoriented from transport position, illustrated in FIG. 2, to the field or planting position, illustrated in FIG. 1, the procedure is substantially as follows. Initially, the latching mechanism 35 is released, and the latching mechanism 36 is also released. The tractor is turned to the left and proceeds to make a U-turn until the pull pole 28 is swung to planting position, as illustrated in FIG. 1, whereupon the latch mechanism 35 is operated to retain the pull pole 28 in planting position, illustrated in FIG. 1 Therefore, the tractor continues to travel in its U-turn, and as the U-turn continues, the grain drill 13 will track behind the tractor and the swing arm 31 will begin to swing in a clockwise direction about its pivot 32 so as to draw the second grain drill 14 nearly abreast of the first grain drill 13. When the second grain drill 14 is oriented nearly abreast of the first grain drill 13, the tractor is stopped, and by simply reversing the tractor and the first grain drill, the swing arm 31 and the second grain drill 14 will swing substantially into the position illustrated in FIG. 1, whereupon the latching mechanism 35 is operated again and further latches the swing arm 31 in the position illustrated in FIG. 1. By simply traveling forwardly a short distance, the second grain drill 14 will swing slightly toward the first grain drill 13 so that the adjoining side portions 15.2 and 16.2 of the front frames 15 and 16 of the two grain drills will be in closely adjoining relation. The tie bar 37 may easily then be put into place and the implements may be used for their ordinary field use. In some instances, a cable may be substituted for tie bar 37 to accomplish the same result of holding the two implements 13, 14 together.

The stationary hitch frame 34, forming a forward extension of the front frame 15 on the grain drill 13, includes an elongate rigid box channel 38 which is welded to the side portion 15.2 of the front frame 15 of the grain drill 13. The hitch frame 34 also includes a rigid transverse beam 39 with its opposite ends welded to the box channel 38 and to the towing tongue 21; and the hitch frame 34 also includes a diagonal brace beam 40 with its opposite ends affixed as by welding to the forward end of the box channel 38 and also to the transverse beam 39 adjacent the towing tongue 21.

The box channel 38 also has a keeper portion or rigid latch plate 41 welded across the front end thereof and protruding transversely from the side of the box channel 38. The latch plate 41 has an aperture or keeper opening 42 for the latching mechanism 35 on the pull pole 28.

The stationary box channel 38 also has a generally U-shaped guide and stop plate 43 welded onto the latch plate 41, and with the open side of the U-shape facing transversely toward to the pull pole 28 as the pull pole swings from its transport position, illustrated in FIG. 2, to the planting position, illustrated in FIG. 1.

The guide plate 41 and the keeper opening 42 receive an extendible and retractable latching pin 44 of the latching mechanism 35. The latching pin 44 comprises the piston rod, or an extension thereof, of the hydraulic cylinder 45 which constitutes a principal part of the latching mechanism 35. Additional detail of the latching mechanism is described hereafter. Of course the latching pin 44 could, in a simpler arrangement, be manually operated without the use of the hydraulic cylinder.

The forward end of the box channel 38 has a pair of rigid and stationary guiding ears 46 protruding transversely therefrom in spaced relation with each other and diverging from each other as to guide the swing arm 31 into the position illustrated in FIG. 1 wherein the inner portion or inner leg 47 of the swing arm 31 lies parallel to and against the stationary box channel 38.

The swing arm 31 also comprises a transverse leg or outer end portion 48, one end portion 48.1 of which is affixed as by welding to the adjacent end portion 47.1 of the inner leg 47. The transverse leg 48 is oriented substantially at right angles with respect to the inner leg 47, although an obtuse angle between the inner and outer legs 47 and 48 may be suitable in certain circumstances. The swing arm 31 also includes a diagonal bracing leg 49 having its opposite ends affixed by welding to the inner and outer legs 47, 48 of the swing arm. As illustrated, the inner and outer legs 47, 48 and the brace leg 49, may be strengthened by bracing gussets 48.2 welded at the joints between the several legs.

The latch bar or insert 50, which is a portion of the latching mechanism 36, is secured to the brace leg 49 by a pivot pin 50.1 and relates to the remainder of the latch mechanism 36 as hereinafter more fully described. The outer end of the transverse leg 48 of the swing arm is swingably or pivotally secured to the end of the extension 13 on the towing tongue 22 of the second grain drill 14 by means of the pivot pin or rotatable connector means 33.

Figure 10:
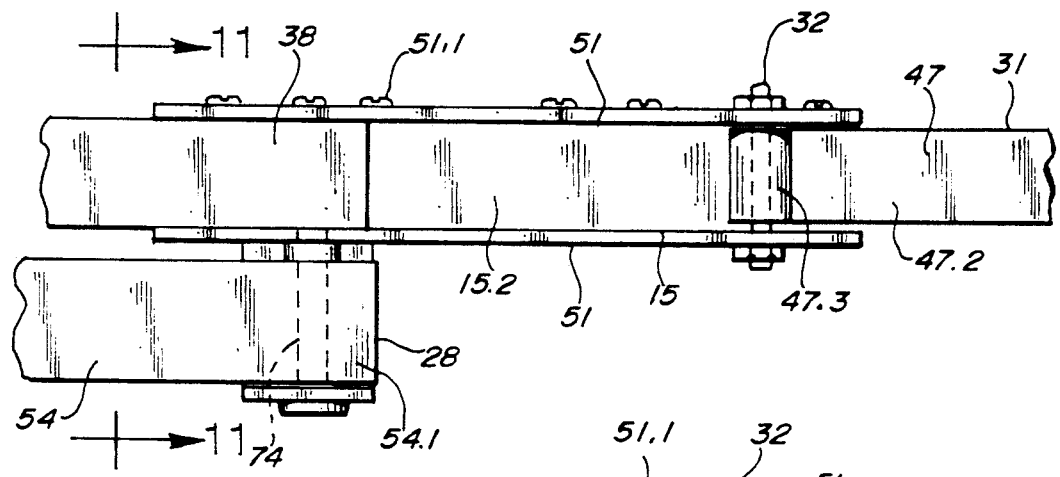
FIG. 10 is a detail elevation view illustrating the connections of the pull pole and swing arm to the front frame of the first grain drill, as viewed substantially at 10—10 of FIG. 2.

The mounting end portion 47.2 of the inner leg 47 of the swing arm 31 has a mounting bushing 47.3 at its end receiving the pivot pin 32 therethrough. The pivot pin 32 is affixed in a pair of mounting plates 51 which are affixed by screws 51.1 to the stationary box channel 38 of the hitch frame 34 and also to the side portion 15.2 of the front frame of the grain drill 13. As seen in FIGS. 1, 2 and 10, the inner leg 47 of the swing arm 31 may swing through approximately 180° to extend either directly forwardly along box channel 38 in the planting position of the swing arm 31 illustrated in FIG. 1 and to extend directly rearwardly along the side portion 15.2 of the front frame 15 to the transport position thereof illustrated in FIG. 2.

Figure 4:
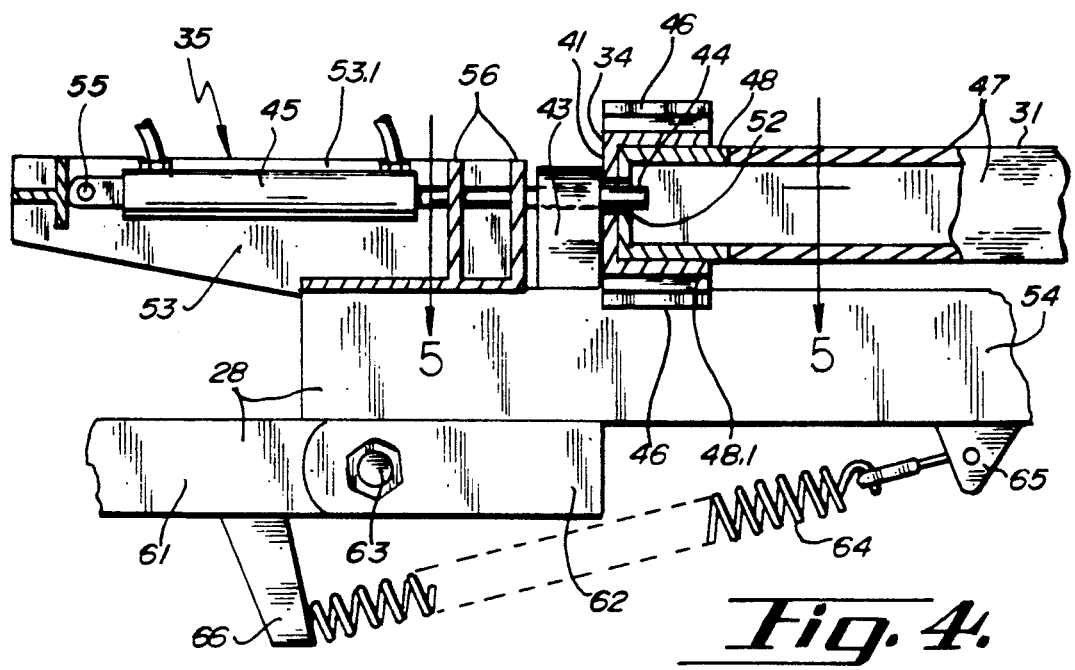
FIG. 4 is a detail section view taken approximately at 4—4 in FIG. 1.
Figure 5:
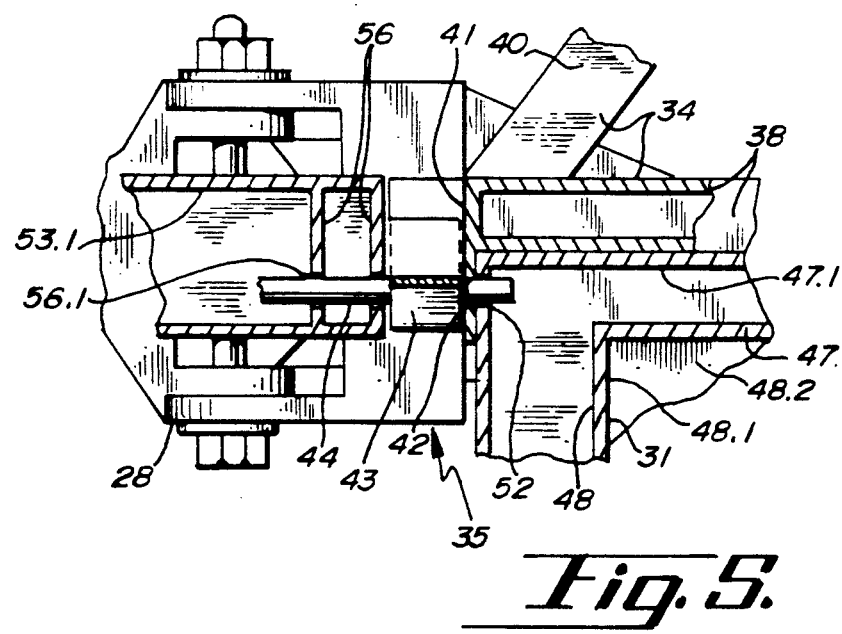
FIG. 5 is a detail section view taken approximately at 5—5 in FIG. 4.
Figure 6:
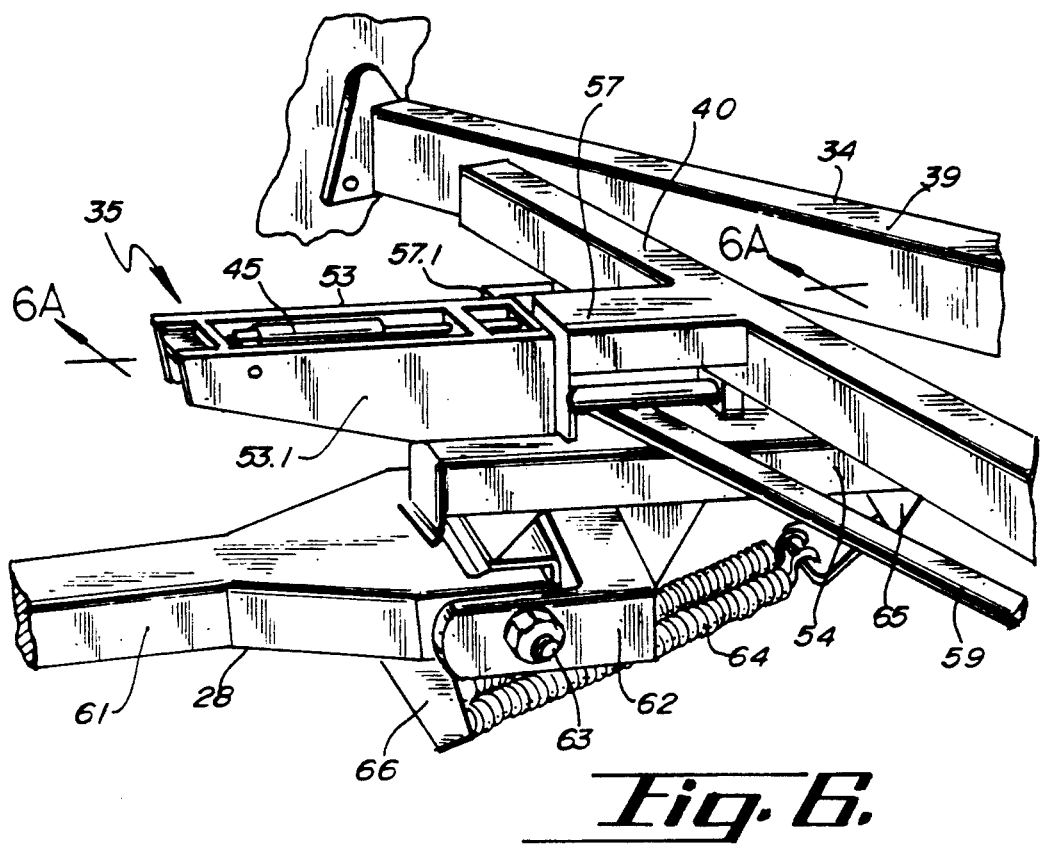
FIG. 6 is a detail perspective view of the latching mechanism retaining the pull pole in transport position, as viewed substantially at 6—6 in FIG. 2.
Figure 6A:
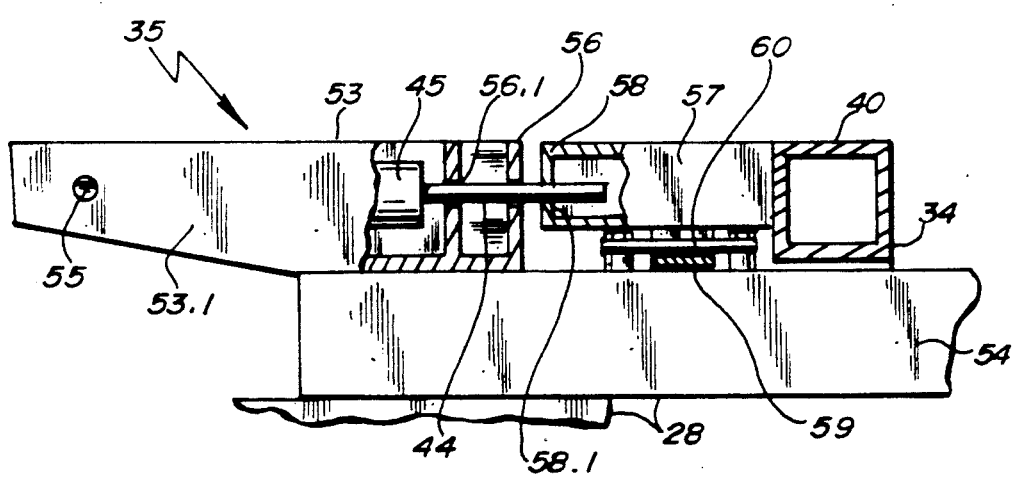
FIG. 6A is a detail section view taken approximately at 6A—6A in FIG. 6.

As best seen in FIGS. 4 and 5, the inner end portion 48.1 of the transverse leg of the swing arm 31 has a pin receiving aperture or keeper opening 52 to receive the latch pin 44 when extended. Accordingly, when the latch pin 44 is retracted out of the keeper opening 52, the swing arm 31 is free to swing from the position illustrated in FIG. 1 for repositioning the second grain drill from the planting position to the transport position.

Ordinarily, when the implements 13, 14 are to be moved from planting position of FIG. 1 to transport position of FIG. 2, the latch pin 44 is retracted simultaneously from keeper opening 52 to release the swing arm 31, and from keeper opening 42 to release the pull pole 28, to allow both the swing arm 31 and pull pole 28 to begin swinging from their planting positions of FIG. 1 toward their transport positions of FIG. 2. However, when the implements are being returned from transport position of FIG. 2 to planting position of FIG. 1, latch pin will be extended in two stages, first into the keeper opening 42 to secure the pull pole 28 in its transport position, and secondly into keeper opening 52 after the swing arm 31 is swung into its planting position with the inner leg 47 thereof lying against the box channel 38 of the hitch frame 34.

The latching mechanism 35 also comprises a bracket frame 53 affixed as by welding on the end portion of the main leg 54 of the pull pole. The bracket frame 53 carries a mounting pin 55 securing the hydraulic cylinder 45 to the bracket frame. The bracket frame includes a pair of upright guiding plates 56 with bearing apertures 56.1 therein through which the latch pin 44 is slidable as to be guided in its extension and retraction. The bracket frame 53 has side panels 53.1 which carry the mounting pin 55 for the cylinder 45 and which also protect the cylinder during normal use of the machinery.

In order to retain the pull pole 28 in the oblique position for transport illustrated in FIG. 2, a second rigid keeper portion or frame 57 is affixed to the diagonal brace 40 of the hitch frame 34. The keeper frame 57 is an elongate box-like structure with a latch plate 58 traversing its outer end and having a pin receiving keeper opening 58. therein to receive the latch pin 44 of the latch mechanism 35 when extended. In order to properly position the bracket frame 53 and the latch pin 44, a stop 57.1 is attached to the side of the keeper frame 57 to engage the bracket frame when the bracket frame is swung to the transport position with the pull pole 28.

A stationary support bar 59 extends generally along the diagonal brace 40 of the hitch frame 34 and beneath the keeper frame 57. A supporting slide 60 affixed on the top of the main leg 54 of the pull pole 28 overlies the guide bar 59 to slide thereon support the pull pole and assist in aligning the latch pin 44 with the keeper aperture 58.1.

The latching mechanism 35 will be recognized to have multiple function; to locate and retain the pull pole 28 in its alternate planting and transport positions, and to releasably retain the swing arm 31 in its planting position.

The pull pole 28 is articulated between its main leg 54 and its front leg 61 upon which the connector portion 30 is affixed for detachable connection to the drawbar 11 of the tractor. A mounting bracket 62 is affixed as by welding onto the outer end of the main leg 54 of the pull pole 28, and the mounting bracket carries a pivot pin 63 which also extends through a mounting bushing in the front leg 61 of the pull pole 28. Accordingly, the pivot 63 allows at least limited upward and downward movement of the front leg 61 so as to accommodate some movement between the tractor and the grain drills in an up and down direction as the assembly travels over an agricultural field. A retaining spring 64 is connected between mounting ears 65 on the main leg 54 of the pull pole, and a second mounting bracket 66, which is affixed on the bottom side of the front leg 61 of the pull pole. Accordingly, the spring 64 tends to keep the pull pole 28 straight and level.

Figure 15:
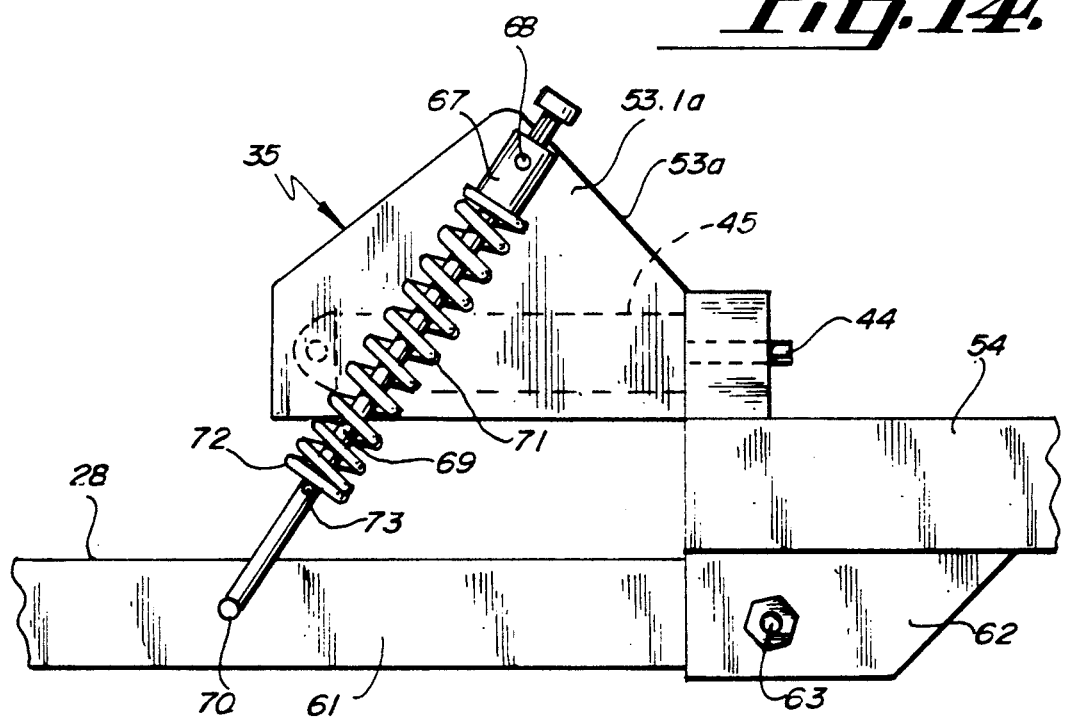
FIG. 15 illustrates a modified, but preferred, form of articulated joint in the pull pole.

A slightly modified and preferred form of joint between the main leg 54 and the front leg 61 of the pull pole 28 is illustrated in FIG. 15. A slightly modified form of bracket frame 53 for mounting the hydraulic cylinder of the latch mechanism 35 is illustrated in FIG. 15 wherein the side panels 53.1a are somewhat enlarged in an upward direction. A slide bushing 67 is rotatably mounted on the side panel 53.1a by a pin 68, and slidably receives a rigid rod 69 therethrough. The lower end of the rod 69 is pivotally mounted in a bearing aperture 70 in the front leg 61 of the pull pole; and a compression spring 71 surrounds the rod 69 with one end bearing against the slide bushing 67 and the other end bearing against an anchoring disk 72 and pin 73 protruding through a pin hole in the rod 69. Accordingly, in the event the front leg 61 of the pull pole 28 swings upwardly with respect to the main leg 54 thereof, the spring 71 will urge the front leg 61 downwardly again to maintain the pull pole 28 substantially straight and in alignment.

Figure 11:
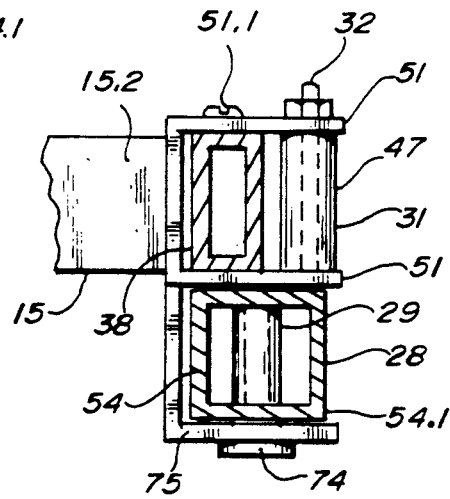
FIG. 11 is a detail section view taken approximately at 11—11 of FIG. 10.
Figure 12:
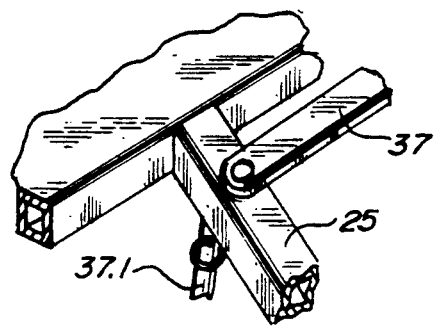
FIG. 12 is a detail perspective view illustrating the removable connection of the tie bar retaining the two field implements or grain drills in their planting position as illustrated in FIG. 1.

With particular attention to FIGS. 10 and 11, the rear end portion 54.1 of the main leg 54 of the pull pole 28 is mounted for horizontal swinging on a pivot pin 74 which provides the pivot 29 referred to in connection with FIGS. 1 and 2. Pivot pin 74 extends through bearing apertures in the main leg 54, and the pivot pin 74 is carried in a mounting bracket 75 comprising an extension of the mounting plates 51 for the swing arm 31. It will be recognized that the rear end portion 54.1 is thereby connected through the bracket 75 to the rear end portion of the box channel 38 and the side portion 15.2 of the front frame of the first grain drill 13. The mounting pin 74 accommodates swinging of the pull pole 28 between its oblique transport position, illustrated in FIG. 2, and the forwardly extending orientation for the planting position illustrated in FIG. 1.

Figure 7:
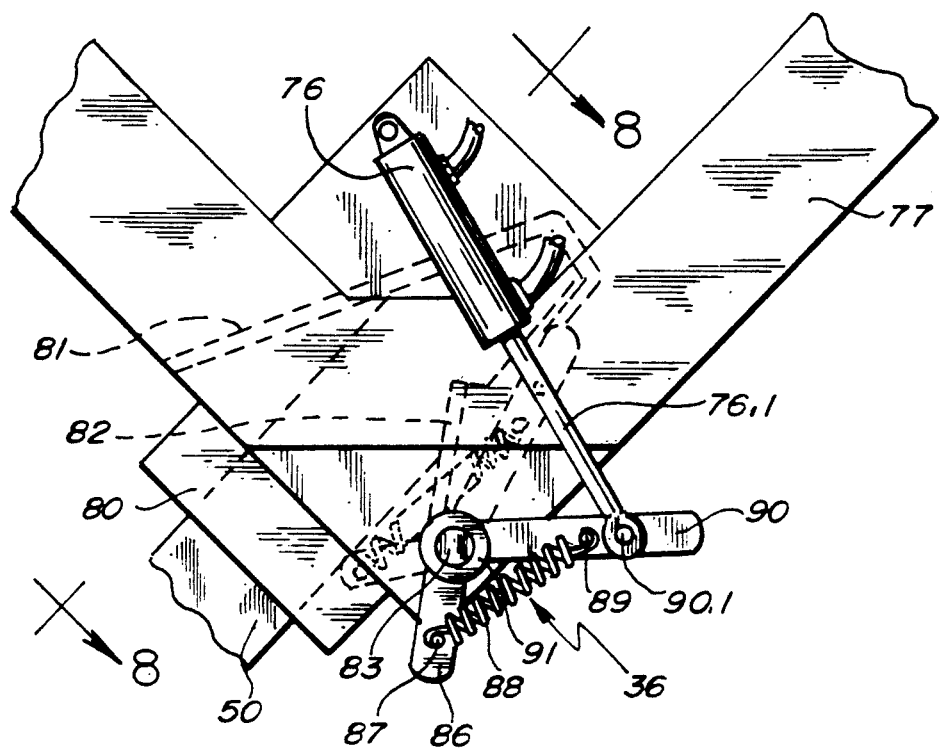
FIG. 7 is an enlarged detail elevation view of the latching mechanism retaining the swing arm in transport position.
Figure 8:
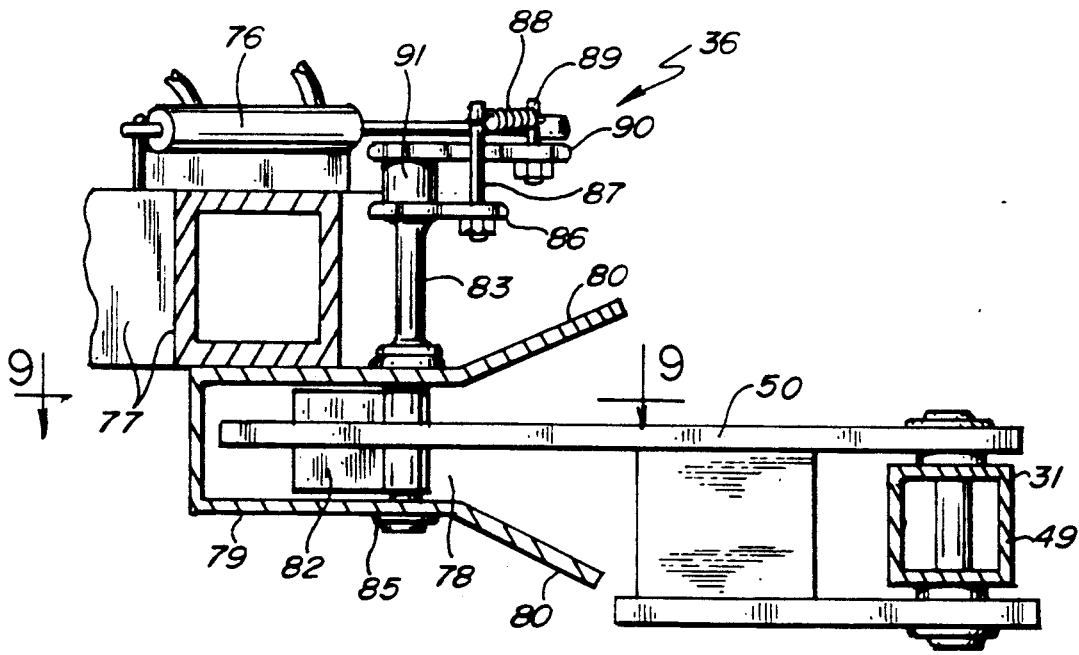
FIG. 8 is a detail section view taken approximately at 8—8 in FIG. 7.
Figure 9:
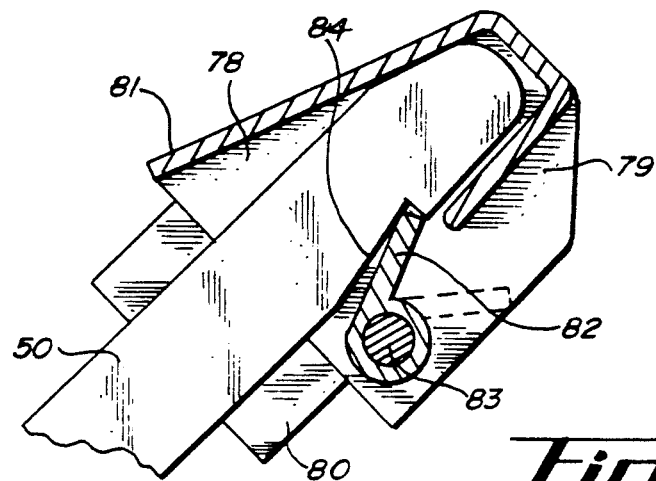
FIG. 9 is a detail section view taken approximately at 9—9 in FIG. 8.

The latch mechanism 36 for securing the swing arm in its transport position is illustrated in detail in FIGS. 7, 8 and 9. Although the latch mechanism 36 might be replaced by a simple pin releasably attaching the swing arm 31 to the latch frame 77 on implement 13, the preferred latch mechanism 36 includes a remotely operable hydraulic cylinder 76 that may be operated from the tractor. The latch mechanism 36 receives the insert bar 50 automatically as the swing arm 31 is swung into its transport position illustrated in FIG. 2, and in order to release the insert or latch bar 50, a hydraulic cylinder 76 must be operated.

The first grain drill 13 carries a latch frame 77 at its rear side, and the latch frame is substantially V-shaped, being affixed as by welding to the main frame of the grain drill 13. The latch mechanism 36 comprises a keeper pocket 78 defined by plates 79, the outer portions 80 of which flare divergently as to guide the insert or latch bar 50 into the pocket. A sidewall 81 of the keeper pocket 78 is also tapered to guide the end of the insert bar 50 into the pocket. A swingable keeper plate 82 is affixed to an upright mounting shaft 83 to be rotatable with the shaft 83, and the keeper plate 82 is swingable between a latching position, illustrated in full lines in FIG. 9, and a releasing position, illustrated in dotted lines therein. The keeper plate 82, in its latching position, will fit into the latching notch 84 in the end of the insert or latch bar 50 and retain the bar in the pocket 78, thereby retaining the swing arm 31 in its transport position of FIG. 2. The mounting and operating shaft 83 for the keeper plate 82 is mounted in bushings 85 on the plates 79 and extends upwardly therefrom. The shaft 83 has an operating arm 86 affixed thereon for turning the shaft and thereby turning the keeper plate 82 between the two positions illustrated.

The operating arm 86 has, at its outer end, a stationary upright pin 87 affixed thereon and connected to one end of a tension spring 88, the other end of which is connected to an anchoring pin 89 on a swingable operating arm 90 affixed to a collar 91 rotatably mounted on the upper end of the shaft 83 so that the arm 90 may oscillate between the two positions illustrated in FIG. 7 without turning shaft 83.

The arm 90 is connected by a pin 90.1 to the end of the piston rod 76.1 of the cylinder 76 so that the retraction of the piston rod will swing the arm 90 between the full line position and the dotted line position illustrated. From the position illustrated in full lines in FIG. 7, when the piston rod 76.1 is retracted, the arm 91 is swung counterclockwise thereby which moves the spring 88 beyond the center of the shaft 83, and pulls the operating arm or lever 86 to the dotted line position illustrated in FIG. 7. As the arm 86 swings the full line position as illustrated, to the dotted line position in FIG. 7, the keeper plate 82 is swung out of the notch 84 so as to release the latch or insert bar 50. Note that the tractor may have to be moved slightly rearwardly to move implement 13 and remove any binding pressure that may be on the keeper plate 81 in order to allow the keeper plate 82 to move. Accordingly, when the latch mechanism 36 is to be operated to release the swing arm 31 to return the second grain drill 14 from transport position to planting position, the hydraulic cylinder 76 need merely be retracted to release the latch. The hydraulic cylinder may then be returned to the extended position, as illustrated in FIG. 7, in preparation for the insert or latch bar 50 to be inserted into the keeper pocket subsequently.

As illustrated in FIG. 1, the tie bar 37 may be placed between the adjacent mounting brackets 25 of the two grain drills 13, 14 in order to hold the grain drills tightly together in their planting positions. Removable pins at each end of the tie bar 37 are inserted through apertures in the respective mounting brackets 25 for the wheels 24 to hold the grain drills 13, 14 in their preferred planting position.

Figure 13:
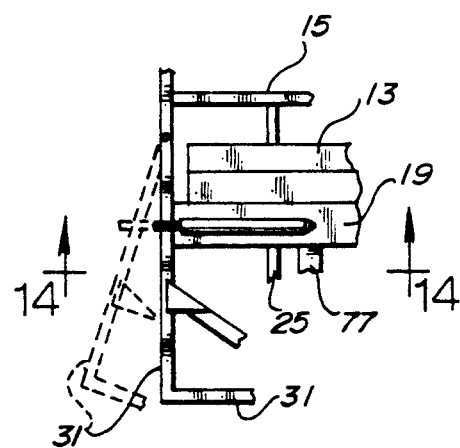
FIG. 13 is a detail elevation view of a portion of the hitch apparatus and illustrating a modified form of latching mechanism for retaining the swing arm in transport position.
Figure 14:
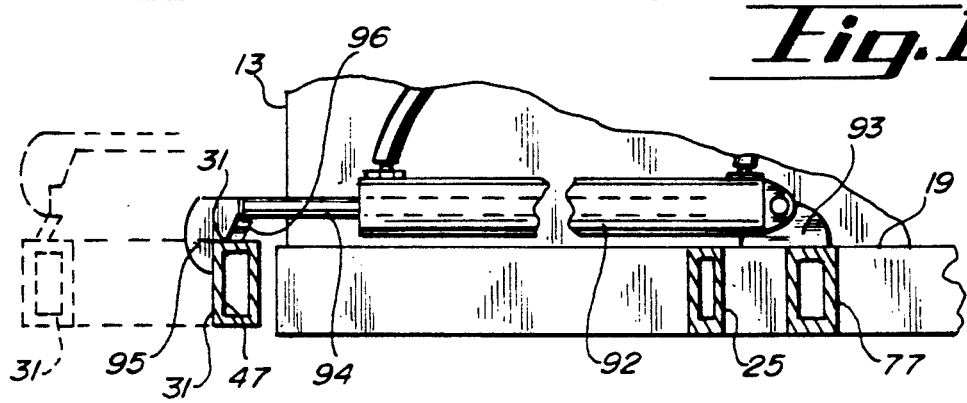
FIG. 14 is an enlarged detail section view taken approximately at 14—14 of FIG. 13.

In a slightly modified form illustrated in FIGS. 13 and 14, a long hydraulic cylinder 92 is mounted on the deck 19 of the first grain drill 13 and is attached thereto by ears 93. The piston rod 94 of the cylinder has a hook-shaped grasping tool 95 on its outer end to reach out and attach to the inner leg 47 of the swing arm to pull the swing arm into its final position as to lie flush against the adjacent side of the grain drill 13 and as to properly position the swinging connection 33 as to position the second grain drill 14 directly behind the grain drill 13. When the grain drill 14 is to be returned to planting position, the piston rod of the cylinder 92 will be extended, and a camming device 96 on the inner leg 47 of the swing arm may slide under the piston rod and raise the hook-shaped device 95 away from the inner leg 47 of the swing arm.

Where herein connections between parts are indicated to be by welding, such connections may alternately be made by bolts. Also, the grain drills 13.14 may be disconnected from the hitch and from each other and may be operated alone.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. Apparatus to be towed behind a tractor alternately during field use and during transport, comprising first and second field implements comprising a pair of fixed orientation rear support wheels to roll forwardly during field use and transport, and a front wheel mounted on an upright pivot to be turnable from side to side, said implements having a transport position wherein the first implement is arranged in front of the second implement, and said implements also having a field position wherein the implements are arranged in side-by-side relation and in substantial alignment with each other, each of said implements having a front frame comprising a central portion, the front frame of each implement also having a side portion adjoining the side portion of the other implement when the two implements are arranged in field position, a pull pole swingably secured to said front frame of the first implement and comprising a front end attachable to the tractor drawbar during both field use and transport, said pull pole being swingable to and between a transport position wherein said front end substantially aligns with said central portion, and a field position wherein said front end substantially aligns with the adjoining side portions of the front frames when the aligned and side-by-side implements are in planting position, a swing arm for towing the second implement and comprising inner and outer end portions extending transversely of each other, pivot means swingably attaching the inner end portion of the swing arm to the side portion of the front frame of the first implement, and rotatable connector means swingably attaching the outer end portion of the swing arm to the central portion of the front frame of the second implement, said swing arm being swingable to and between a field position and a transport position, in the field position of the swing arm the inner end portion thereof extends forwardly of the side portion of the first implement and the outer end portion extends transversely from said inner end portion to the central portion of the second implement while the first and second implements are in side-by-side and aligned field position, in the transport position of said swing arm the inner end portion thereof extends rearwardly from the side portion of the first implement and the outer end portion thereof extends transversely from said inner end portion and behind said first implement to the central portion of the second implement while the first and second implements are in transport positions.

2. Apparatus according to claim 1 wherein latching means is provided between the pull pole and the front frame of said first implement to retain the pull pole alternately in said transport and field positions.

3. Apparatus according to claim 2 wherein said latching means also releasably retains the swing arm stationary with respect to the front frame of the first implement and in field position.

4. Apparatus according to claim 2 wherein said latching means comprises a hydraulic cylinder on the pull pole and a latch pin operated by the hydraulic cylinder to be extended into and retracted from keeper openings in the front frame.

5. Apparatus according to claim 4 wherein said swing arm comprises a latch pin receiving keeper opening aligned with one of the keeper openings of the front frame to receive the latch pin and be retained thereby in field position.

6. Apparatus according to claim 2 wherein the front frame of the first implement comprises keeper portions spaced from each other and alternately traversed by the pull pole in field and transport positions, said keeper portions comprising latch plates with keeper openings therein; said latching means comprising a hydraulic cylinder on the pull pole and an extendible and retractable latch pin operated by the hydraulic cylinder and alternately aligned with the keeper openings to be inserted therein when the pull pole is alternately in field and transport positions.

7. Apparatus according to claim 6 wherein the pull pole comprises a rear main leg swingably secured to said front frame of the first implement, and a front leg comprising said front end attachable to the tractor, said main leg and front leg being jointed for relative articulation about a horizontal pivot, said hydraulic cylinder being mounted on said main leg.

8. Apparatus according to claim 1 wherein latching means is provided between said swing arm and the front frame of the first implement and retaining said swing arm in said field position as to maintain the implements in side-by-side aligned field position.

9. Apparatus according to claim 1 wherein latching means is provided between said swing arm and said first implement for retaining the swing arm in said transport position, whereby to retain the connector means centrally behind the first implement to retain and pull the second implement in transport position.

10. Apparatus according to claim 1 and releasable means retaining the first and second implements in adjoining side-by-side relation in said field position.

11. Apparatus according to claim 1 wherein the pull pole comprises a joint intermediate its length to accommodate up and down movement of the front end adjacent the tractor.

12. Apparatus to be towed behind a tractor alternately during planting in a field and during transport, comprising first and second grain drills each comprising a pair of fixed orientation rear support wheels to roll forwardly during planting and transport, and a front wheel mounted on an upright pivot to be turnable from side to side, said grain drills having a transport position wherein the first drill is arranged in front of the second drill, and said grain drills also having a planting position wherein the drills are arranged in side-by-side relation and in substantial alignment with each other, each of said grain drills having a front frame comprising a central towing portion, the front frame of each grain drill also having a side portion adjoining the side portion of the other grain drill when the two grain drills are arranged in side-by-side planting position, a pull pole swingably secured to said front frame of the first implement and comprising a front end attachable to the tractor draw bar during both planting and transport, said pull pole being swingable to and between a transport position wherein said front end substantially aligns with said central portion of the first grain drill, and a planting position wherein said front end of the pull pole substantially aligns with the adjoining side portions of the front frames when the aligned and side-by-side grain drills are in planting position, a swing arm for towing the second grain drill and comprising inner and outer end portions extending transversely of each other, pivot means swingably attaching the inner end portion of the swing arm to the side portion of the front frame of the first grain drill, and a rotatable connector means swingably attaching the outer end portion of the swing arm to the central portion of the front frame of the second grain drill, said swing arm being swingable to and between a planting position and a transport position, in the planting position of the swing arm, the inner end portion thereof extends forwardly of the side portion of the first grain drill and the outer end portion extends transversely from said inner end portion to the central portion of the second grain drill and while said first and second grain drills are in side-by-side and aligned planting position, in the transport position of said swing arm, the inner end portion thereof extends rearwardly from the side portion of the first grain drill and the outer end portion thereof extends transversely from said inner end portion to the central portion of the second grain drill while the first and second grain drills are arranged one behind the other in transport positions.

13. Apparatus according to claim 12 wherein said pull pole is swingably secured to said front frame in spaced relation with the central portion of said front frame.

14. Apparatus according to claim 12 wherein said pull pole is swingably secured to said side portion of the front frame.

15. Apparatus according to claim 12 wherein first latching means are provided alternately retaining and releasing the pull pole in planting and transport positions and also releasably retaining the swing arm in field position, and a second latching means releasably retaining the swing arm in transport position with the outer end portion of the swing arm located behind the first grain drill to maintain the second grain drill directly behind the first grain drill.

* * * * *